US012745269B2

(12) United States Patent
Zheng et al.

(10) Patent No.: US 12,745,269 B2
(45) Date of Patent: Sep. 22, 2026

(54) SEARCH SPACE CONFIGURATION FOR MULTICAST TRAFFIC

(71) Applicant: Nokia Technologies Oy, Espoo (FI)

(72) Inventors: Naizheng Zheng, Beijing (CN); Volker Pauli, Munich (DE); Athul Prasad, Naperville, IL (US); Ugur Baran Elmali, Munich (DE); David Navrátil, Espoo (FI); Karol Schober, Espoo (FI); David Bhatoolaul, Swindon (GB)

(73) Assignee: Nokia Technologies Oy, Espoo (FI)

( * ) Notice: Subject to any disclaimer, the term of this patent is extended or adjusted under 35 U.S.C. 154(b) by 499 days.

(21) Appl. No.: 18/248,776

(22) PCT Filed: Oct. 20, 2020

(86) PCT No.: PCT/CN2020/122277
§ 371 (c)(1),
(2) Date: Apr. 12, 2023

(87) PCT Pub. No.: WO2022/082456
PCT Pub. Date: Apr. 28, 2022

(65) Prior Publication Data

US 2023/0413296 A1 Dec. 21, 2023

(51) Int. Cl.
*H04W 72/30* (2023.01)
*H04W 4/06* (2009.01)

(52) U.S. Cl.
CPC ............. *H04W 72/30* (2023.01); *H04W 4/06* (2013.01)

(58) Field of Classification Search
CPC ....... H04W 72/30; H04W 4/06; H04W 72/56; H04L 12/189; H04L 12/1881; H04L 5/0064; H04L 5/0053
(Continued)

(56) References Cited

U.S. PATENT DOCUMENTS

2018/0048984 A1 2/2018 Park et al.
2018/0279268 A1 9/2018 You et al.
(Continued)

FOREIGN PATENT DOCUMENTS

CN 103368716 A 10/2013
CN 107733626 A 2/2018
(Continued)

OTHER PUBLICATIONS

"3rd Generation Partnership Project; Technical Specification Group Radio Access Network; NR; Physical layer procedures for control (Release 17)", 3GPP TS 38.213, V17.5.0, Mar. 2023, pp. 1-262.
(Continued)

*Primary Examiner* — Chandrahas B Patel
*Assistant Examiner* — Meheret Woldegebreal Kidane
(74) *Attorney, Agent, or Firm* — Nokia Technologies Oy

(57) ABSTRACT

Embodiments of the present disclosure relate to methods, apparatuses and computer readable storage media for search space configuration for multicast traffic. According to embodiments of the present disclosure, a first device determines, from a group of search space sets configured to the first device, at least one search space set for monitoring multicast traffic from a second device, based on at least one of a priority of the multicast traffic and respective types of the search space sets. The first device monitors the multicast traffic from the second device in the at least one search space set. The solution enables multicast traffic to be monitored in a common search space set, a user-specific search space set or a multicast search space set in different scenarios.

20 Claims, 5 Drawing Sheets

400

410

DETERMINE, FROM A GROUP OF SEARCH SPACE SETS, AT LEAST ONE SEARCH SPACE SET FOR MONITORING MULTICAST TRAFFIC FROM A SECOND DEVICE

420

MONITOR THE MULTICAST TRAFFIC FROM THE SECOND DEVICE IN THE AT LEAST ONE SEARCH SPACE SET

(58) Field of Classification Search
USPC .......................................................... 370/312
See application file for complete search history.

(56) References Cited

U.S. PATENT DOCUMENTS

2019/0150073 A1 5/2019 Tiirola et al.
2019/0174510 A1* 6/2019 Shin .......................... H04L 1/08
2019/0223164 A1 7/2019 He et al.
2019/0281418 A1 9/2019 Chen et al.
2019/0341992 A1 11/2019 Zhou et al.
2020/0100248 A1 3/2020 Kim et al.
2020/0280971 A1 9/2020 Moon et al.
2020/0288482 A1 9/2020 Yi et al.
2021/0250958 A1* 8/2021 Liu ....................... H04L 5/0053
2021/0314997 A1* 10/2021 Seo ....................... H04L 5/0053

FOREIGN PATENT DOCUMENTS

CN 109802758 A 5/2019
CN 110959304 A 4/2020
EP 3500035 A1 6/2019
KR 101098592 B1 12/2011
WO 2019/112209 A1 6/2019
WO 2020/055191 A1 3/2020

OTHER PUBLICATIONS

"3rd Generation Partnership Project; Technical Specification Group Radio Access Network; NR; Radio Resource Control (RRC) protocol specification (Release 17)", 3GPP TS 38.331, V17.4.0, Mar. 2023, pp. 1-1324.
"3rd Generation Partnership Project; Technical Specification Group Radio Access Network; NR; Multiplexing and channel coding (Release 17)", 3GPP TS 38.212, V17.5.0, Mar. 2023, pp. 1-203.
"3rd Generation Partnership Project; Technical Specification Group Radio Access Network; NR; User Equipment (UE) radio access capabilities (Release 17)", 3GPP TS 38.306, V17.4.0, Mar. 2023, pp. 1-255.
Notice of Allowance received for corresponding Chinese Patent Application No. 202080107758.9, dated Dec. 27, 2024, 4 pages of Notice of Allowance and no page of translation available.
"Search space and collision handling for multicast in NB-IoT", 3GPP TSG RAN WG1 Meeting #86, R1-166199, Agenda: 7.2.11.2, Huawei, Aug. 22-26, 2016, 4 pages.
Office action received for corresponding Indian Patent Application No. 202347034234, dated Mar. 1, 2024, 5 pages.
Extended European Search Report received for corresponding European Patent Application No. 20958039.8, dated Jun. 14, 2024, 7 pages.
Office action received for corresponding Chinese Patent Application No. 202080107758.9, dated Jul. 17, 2024, 8 pages of office action and 5 pages of translation available.
"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.
"3rd Generation Partnership Project; Technical Specification Group Radio Access Network; NR; Medium Access Control (MAC) protocol specification (Release 16)", 3GPP TS 38.321, V16.1.0, Jul. 2020, pp. 1-151.
"WID revision: NR Multicast and Broadcast Services", 3GPP TSG RAN Meeting #88-e, RP-201038, Agenda: 9.10.8, Huawei, Jun. 29-Jul. 3, 2020, 6 pages.
"3rd Generation Partnership Project; Technical Specification Group Radio Access Network; NR; Physical layer procedures for control (Release 16)", 3GPP TS 38.213, V16.2.0, Jun. 2020, pp. 1-176.
"Discussion on PDCCH monitoring reduction during DRX active time", 3GPP TSG RAN WG1 #102-e, R1-2006223, Agenda: 8.7.2, CMCC, Aug. 17-28, 2020, 3 pages.
"Phase 2 moderator summary on NR Multicast and Broadcast Services", 3GPP TSG RAN WG1 #102-e, R1-200xxxx, Agenda: 8.12, CMCC, Aug. 17-28, 2020, pp. 1-22.
"IEEE 802.11", Wikipedia, Retrieved on May 9, 2023, Webpage available at : https://en.wikipedia.org/wiki/IEEE_802.11.
International Search Report and Written Opinion received for corresponding Patent Cooperation Treaty Application No. PCT/CN2020/122277, dated Jul. 14, 2021, 9 pages.
"Interference coordination for EPDCCH", 3GPP TSG-RAN WG1 Meeting #73, R1-132306, Agenda: 6.2.5.2.1, Nokia Siemens Networks, May 20-24, 2013, 3 pages.

* cited by examiner

SEARCH SPACE CONFIGURATION FOR MULTICAST TRAFFIC

RELATED APPLICATION

This application was originally filed as PCT Application No. PCT/CN2020/122277, filed on Oct. 20, 2020, which is incorporated herein by reference in its entirety.

TECHNICAL FIELD

Embodiments of the present disclosure generally relate to the field of telecommunications, and in particular, to methods, apparatuses and computer readable media for search space configuration for multicast traffic.

BACKGROUND

In the upcoming Release 17 (Rel-17) of 3GPP specifications for 5G new radio (NR), support of multicast and broadcast services is approved. One objective is to specify a group scheduling mechanism to allow user equipment (UE) to receive multicast/broadcast traffic in RAN1 and RAN2. Moreover, the objective includes specifying necessary enhancements that are required to enable the simultaneous operation with unicast reception.

Single cell point to multipoint (SC-PTM) is one of the transmission schemes for supporting multicast and broadcast services. It has the benefits of reusing the control/data physical channels defined for unicast/point-to-point (PTP) transmissions, as well as enabling efficient multiplexing flexibility between unicast and multicast/broadcast transmissions. It is expected that the approach of SC-PTM will be considered and specified in Rel-17 for support of 5G NR multicast services.

SUMMARY

In general, example embodiments of the present disclosure provide methods, apparatuses and computer readable media for search space configuration for multicast traffic.

In a first aspect, there is provided a method. The method comprises determining, at a first device and from a group of search space sets configured to the first device, at least one search space set for monitoring multicast traffic from a second device, based on at least one of a priority of the multicast traffic and respective types of the search space sets; and monitoring the multicast traffic from the second device in the at least one search space set.

In a second aspect, there is provided a method. The method comprises determining, at a second device and from a group of search space sets configured to a first device, at least one search space set for transmitting multicast traffic to the first device, based on at least one of a priority of the multicast traffic and respective types of the search space sets; and transmitting the multicast traffic to the first device in the at least one search space set.

In a third aspect, there is provided a first device. The first device comprises at least one processor and at least one memory including computer program codes. The at least one memory and the computer program codes are configured to, with the at least one processor, cause the first device to determine, from a group of search space sets configured to the first device, at least one search space set for monitoring multicast traffic from a second device, based on at least one of a priority of the multicast traffic and respective types of the search space sets; and monitor the multicast traffic from the second device in the at least one search space set.

In a fourth aspect, there is provided a second device. The second device comprises at least one processor and at least one memory including computer program codes. The at least one memory and the computer program codes are configured to, with the at least one processor, cause the second device to determine, from a group of search space sets configured to a first device, at least one search space set for transmitting multicast traffic to the first device, based on at least one of a priority of the multicast traffic and respective types of the search space sets; and transmit the multicast traffic to the first device in the at least one search space set.

In a fifth aspect, there is provided an apparatus. The apparatus comprises means for determining, from a group of search space sets configured to the apparatus, a search space set for monitoring multicast traffic from a further apparatus, based on at least one of a priority of the multicast traffic and respective types of the search space sets; and means for monitoring the multicast traffic from the further apparatus in the search space set.

In a sixth aspect, there is provided an apparatus. The apparatus comprises means for determining, from a group of search space sets configured to a further apparatus, a search space set for transmitting multicast traffic to the further apparatus, based on at least one of a priority of the multicast traffic and respective types of the search space sets; and transmitting the multicast traffic to the further apparatus in the search space set.

In a seventh aspect, there is provided a computer program product that is stored on a computer readable medium and includes machine-executable instructions. The machine-executable instructions, when being executed, cause a machine to perform the method according to the above first or second aspect.

In an eighth aspect, there is a computer readable storage medium comprising program instructions stored thereon. The instructions, when executed by an apparatus, cause the apparatus to perform the method according to the above first or second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
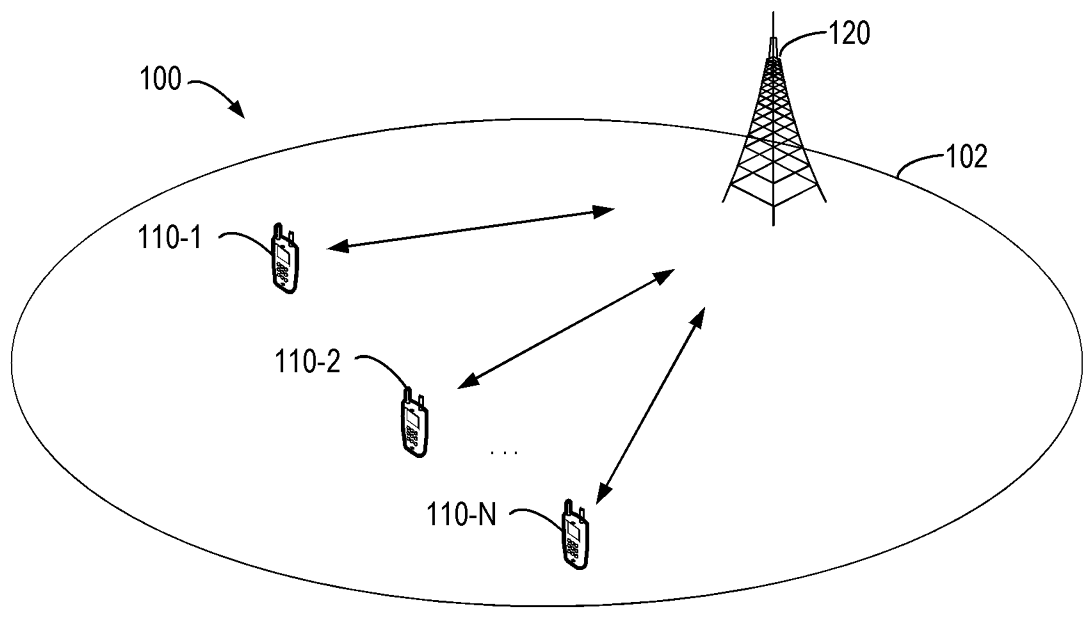
FIG. 1 shows an example communication network in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology. In the following description, the terms "network device", "BS", and "node" may be used interchangeably.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

In the upcoming Rel-17 work item in 3GPP for 5G NR, support of multicast and broadcast services is approved. One objective is to specify a group scheduling mechanism to allow UE to receive multicast/broadcast traffic using the 5G NR air interface, in RAN1 and RAN2. Moreover, the objective includes specifying necessary enhancements required to enable the simultaneous operation with unicast reception. SC-PTM is one of the transmission schemes for supporting multicast and broadcast services. It has the benefits of reusing the control/data physical channels defined for unicast/PTP transmissions, as well as enabling efficient multiplexing flexibility between unicast and multicast/broadcast transmissions. It is expected that the approach of SC-PTM will be considered and specified in Rel-17 for support of 5G NR multicast services.

In NR, physical downlink control channel (PDCCH) may be used to convey downlink control information (DCI). It may utilize Orthogonal Frequency Division Multiplexing (OFDM) waveform and polar coding. PDCCH may utilize one of every four resource elements for demodulation reference signaling. DCI can be used for indicating downlink (DL) and/or uplink (UL) resource allocation. It may also be used for other purposes, such as carrier aggregation and bandwidth part (BWP) (de)activation, frame structure indication (Group common PDCCH) and power control updates.

The monitoring of PDCCH may be carried out by means of blind searches. A blind search (or blind decoding) may refer to a process by which a UE finds its PDCCH by monitoring a set of PDCCH candidates in every monitoring occasion. A monitoring occasion can be once a slot, once per multiple slots or multiple times in a slot. A blind search for PDCCH may be arranged by means of parallel search space (SS) sets mapped to one or more control resource sets (CORESETs). During a PDCCH blind search, a UE may monitor predefined control channel elements (CCEs), aggregated CCEs and/or downlink control information (DCI) formats in predefined time instants, corresponding to configured monitoring occasions.

CCEs may be arranged within a predefined CORESET configured via higher layer signaling. For example, each CCE may include 6 resource element groups (REGs) each consisting of 12 subcarriers within 1 OFDM symbol, and 1, 2 or 3 REG bundles. REG bundles may be mapped into the CORESET either using interleaved or non-interleaved mapping. The UE may assume that REG bundle defines the pre-coder granularity in frequency and time used by a network device (such as, gNB) when transmitting PDCCH. CORESET resources may be configured in units of 6 resource blocks in frequency domain. In Release15 of 3GPP specifications, the maximum number of CORESETs configurable for a BWP in a cell for a UE is 3 and the maximum number of SS sets configurable for a BWP in a cell for a UE is 10, respectively.

A UE expects to monitor PDCCH candidates for up to 4 DCI formats that include up to 3 DCI formats (latency sensitive) with CRC scrambled by Cell-Radio Network Temporary Identifier (C-RNTI) per serving cell and 1 DCI format (latency non-sensitive) with CRC scrambled by other Radio Network Temporary Identifier (RNTI).

PDCCH candidates are mapped into CCEs using a hash function. For a search space set s associated with a control resource set (CORESET) p, the CCE indexes for aggregation level L can be determined based on the hash function, where the number of PDCCH candidates mapped into the SS set s of CCE aggregation level L can be fixed in the 3GPP specification or configured by a network device (such as, gNB). A hashing offset determine based on an initial seed $Y_{p,-1}$ for randomization of the hash function changes every slot for a user-specific search space (USS) set, while is always 0 for a common search space (CSS) set.

In Rel-15 of 3GPP specifications, the maximum number of blind decodes (BDs) and channel estimates (in terms of the number of unique CCEs) that a UE is capable to perform per slot is defined as a function of subcarrier spacing. In Rel-16 of 3GPP specifications, on a primary cell (Pcell) or a primary secondary cell (PScell), a gNB may configure a number of CCEs or BDs that exceeds the UE capability in a slot. In this case, a UE is allowed to drop (that is, not monitor) the USS(s) with the highest index(es) until the number of CCEs or BDs satisfies the UE capability. For CSS, the gNB needs to always make sure that PDCCH candidates and CCEs do not exceed the UE capability.

As described above, in Rel-15/16 of 3GPP specifications, two SS types, i.e., CSS and USS, are defined. On one hand, CCE indexes for CSS are the same for different UEs in the cell, while CCE indexes for USS are different for different UEs in the cell. On the other hand, CSS always has a higher priority than USS in case of PDCCH overbooking, but ultra-reliable and low latency communication (URLLC) traffic can only be monitored in USS. Additionally, only PDCCH candidates in USS can be monitored on a secondary cell (Scell) for carrier aggregation. If traffic for multicast services is always monitored in CSS, this may have a potential impact on URLLC traffic that is monitored in USS in case of PDCCH overbooking. If traffic for multicast services is always monitored in USS, this may have a potential impact on higher-priority multicast services (for example, public safety for life-safe warning of tsunami and an earthquake event). Therefore, how to consider the SS design for 5G NR multicast is an important issue that needs to be addressed.

Embodiments of the present disclosure propose a solution of SS configuration for multicast traffic. This solution enables multicast traffic to be monitored in CSS, USS or a new SS in different scenarios, so as to solve the above problems and one or more of other potential problems. This solution can minimize impacts on Rel-15/16 of 3GPP specifications. Although embodiments of the present disclosure are described with reference to multicast traffic in the following, it is to be understood that embodiments of the present disclosure are also applicable to broadcast traffic. As used herein, the term “multicast traffic” refers to data that is scheduled by the network device for a particular group of users or terminal devices, while the term “broadcast traffic” refers to data that is scheduled by the network device for all users or terminal devices interested in receiving the data.

Principle and implementations of the present disclosure will be described in detail below with reference to FIGS. 1-7. In the following, the terms “multicast traffic”, “multicast service(s)”, “traffic for multicast service(s)”, “broadcast traffic”, “broadcast service(s)” and “traffic for broadcast service(s)” can be used interchangeably.

FIG. 1 shows an example communication network 100 in which implementations of the present disclosure can be implemented. The communication network 100 includes a network device 120 and terminal devices 110-1, 110-2 . . . and 110-N, which can be collectively referred to as “terminal device(s)” 110. The network 100 can provide one or more cells 102 to serve the terminal devices 110. It is to be understood that the number of network devices, terminal devices and/or cells is given for the purpose of illustration without suggesting any limitations to the present disclosure. The communication network 100 may include any suitable number of network devices, terminal devices and/or cells adapted for implementing implementations of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
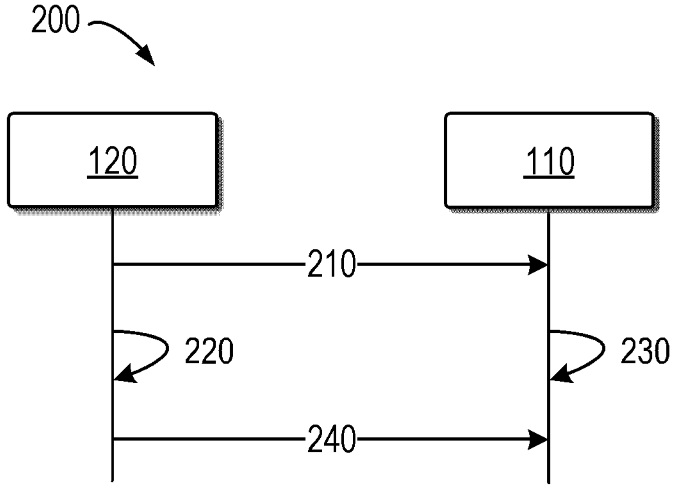
FIG. 2 illustrates a schematic diagram of interactions between devices according to some example embodiments of the present disclosure.

FIG. 2 illustrates a schematic diagram of interactions 200 between devices according to some example embodiments of the present disclosure. For example, the interactions 200 involve the terminal device 110 and the network device 120 shown in FIG. 1.

As shown in FIG. 2, the network device 120 configures 210 a group of SS sets to the terminal device 110. The network device 120 determines 220, from the group of SS sets, a SS set for transmitting multicast traffic to the terminal device 110. Likewise, the terminal device 110 determines 230, from the group of SS sets, a SS set for monitoring the multicast traffic from the network device 120. Then, the network device 120 transmits 240 the multicast traffic to the terminal device 110 in the SS set. Correspondingly, the terminal device 110 monitors 240 the multicast traffic from the network device 120 in the SS set.

In some example embodiments, one of the configured SS sets may be either a CSS set or a USS set. Multicast traffic (for example, traffic for life-safe warning of tsunami and an earthquake event) with a priority higher than a threshold may be transmitted by the network device 120 and monitored by the terminal device 110 in the CSS set, where DCI may be scrambled with Group-Radio Network Temporary Identifier (G-RNTI). Multicast traffic (for example, broadcasting/multicasting of traffic information in Vehicle-to-Everything) with a priority lower than the threshold may be transmitted/monitored in the USS set, where DCI may be scrambled with G-RNTI.

In some example embodiments, the multicast traffic may be by the network device 120 and monitored by the terminal device 110 in the CSS set and an initial seed for calculation of CCE indexes for the CSS set may equal to 0. The index of the CSS set can be determined as specified in Rel-15/16 of 3GPP specification.

In some example embodiments, the multicast traffic may be by the network device 120 and monitored by the terminal device 110 in the USS set and the USS set may comprise an offset or may be configured with a fixed offset. The offset may define an initial seed $Y_{p,-1}$ for slot-based randomization of a hash function of the USS set. For example, the initial seed $Y_{p,-1}$ may be determined based on the offset together with C-RNTI assigned to the terminal device 120. Alternatively, the initial seed $Y_{p,-1}$ may be determined only based on a configured offset. Here the offset could be configured using higher layer signaling by the network device.

As such, different terminal devices comprised in a multicast group can have different offset values which result in the same CCE indexes. This can provide more flexibility to the mapping of PDCCH candidates for multicast. For example, different offset values may be applied to different multicast services. In this way, different multicast services can be associated with same PDCCH candidates with different mappings. Besides, if different multicast services are not intended to be transmitted/monitored at the same time, the configured offsets can result in all of multicast services being associated with same PDCCH candidates. Furthermore, considering the common frequency resources issue for BWP operation, such offset configuration can make sure that PDCCH candidates for multicast traffic are within the overlapped/common frequency resources area for all configured BWPs.

In some example embodiments, the multicast traffic may be transmitted/monitored in the USS set and the USS set may be configured with an initial seed $Y_{p,-1}$ for calculation of CCE indexes to be monitored in the USS set. The initial seed may apply to all RNTIs to be monitored in the USS set.

Alternatively, in some example embodiments, only the SS set configured with an offset for the initial seed $Y_{p,-1}$ or configured with the initial seed $Y_{p,-1}$ can be used for transmitting/monitoring multicast traffic scrambled with G-RNTI. Other SS sets configured with no offset and no initial seed may only be used for transmitting/monitoring unicast traffic. Calculation of CCE indexes for these SS sets can be performed based on C-RNTI as specified in Rel-15/16 of 3GPP specifications.

Alternatively, in some example embodiments, the multicast traffic may be by the network device 120 and monitored by the terminal device 110 in the USS set and the USS set may be configured with no initial seed. The network device 120 may transmit, to the terminal device 110 and via dedicated radio resource control (RRC) signaling, a configuration about the multicast traffic which indicates an offset for the initial seed $Y_{p,-1}$. The offset may implicitly indicate to the terminal device 110 a priority of the multicast traffic and whether the multicast traffic should be monitored in the CSS set or USS set. For example, if an initial seed $Y_{p,-1}$ determined based on the configured offset value equals to 0, it may implicitly indicate that the corresponding multicast traffic is of a high priority and thus should be monitored in the CSS set. If an initial seed $Y_{p,-1}$ determined based on the configured offset value does not equal to 0, it may implicitly indicate that the corresponding multicast traffic is of a low priority and thus should be monitored in the USS set.

In some example embodiments, in case of PDCCH overbooking or in case that the number of CCEs or BDs configured by the network device 120 exceeds the capability of the terminal device 110, the terminal device 110 may drop (that is, not monitor) the USS(s) with the highest index(es) until the number of CCEs or BDs satisfies the UE capability. For CSS, the network device 120 may have to always make sure that PDCCH candidates and CCEs do not exceed the UE capability.

In some example embodiments, a multicast SS (MSS) set can be defined for multicast, which is different from CSS and USS. MSS may have similar characteristics as CSS. For example, the initial seed of the hash function for MSS may equal to 0. In some example embodiments, RRC signaling can be used by the network device 120 for configuring MSS to the terminal device 110. The RRC signaling for configuration of MSS may be similar to that for configuration of USS, except for the fact that the DCI format field can either be omitted since only DCI formats related to scheduling of PDSCH are utilized, or the DCI format field could be modified to indicate whether a particular DCI format among the subset of DCI formats related to scheduling of PDSCH is utilized by using a new field with possible enumerated values.

In some example embodiments, if a MSS set is configured to the terminal device 110, the multicast traffic may be by the network device 120 and monitored by the terminal device 110 in the MSS set. For example, the MSS set may not be used for transmitting/monitoring unicast traffic.

In some example embodiments, a priority of the MSS set can be determined based on an index of the MSS set. That is, the priority of the MSS can be between priorities of CSS and USS sets, lower than priorities of all USS sets or between priorities of different USS sets. In case of PDCCH overbooking or in case that the number of CCEs or BDs configured by the network device 120 exceeds the capability of the terminal device 110, the terminal device 110 may drop (that is, not monitor) the MSS(s) or USS(s) with the highest index(es) until the number of CCEs or BDs satisfies the UE capability. For CSS, the network device 120 may have to always make sure that PDCCH candidates and CCEs do not exceed the UE capability.

Figure 3A:
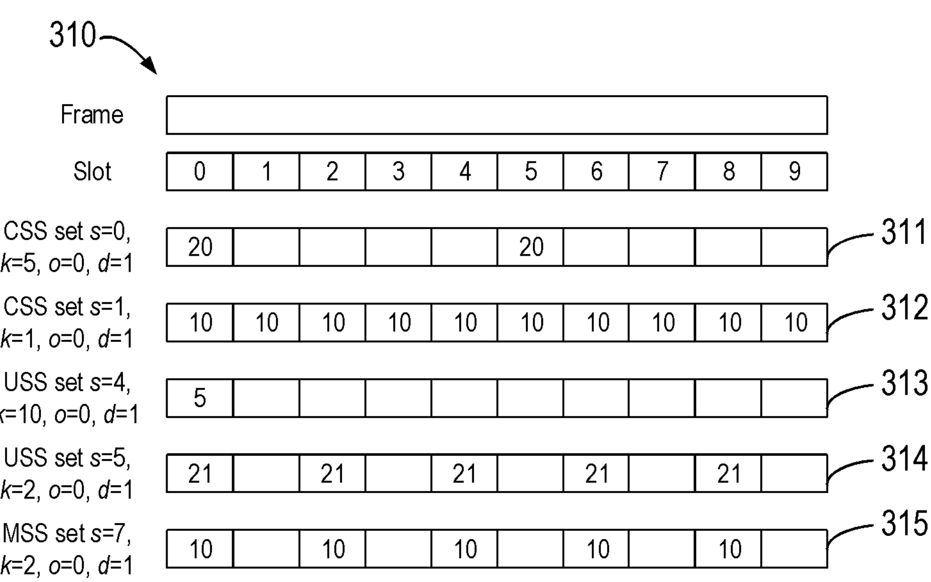
FIGS. 3A-3C illustrate different scenarios of handling priorities of search space sets according to some example embodiments of the present disclosure.
Figure 3B:
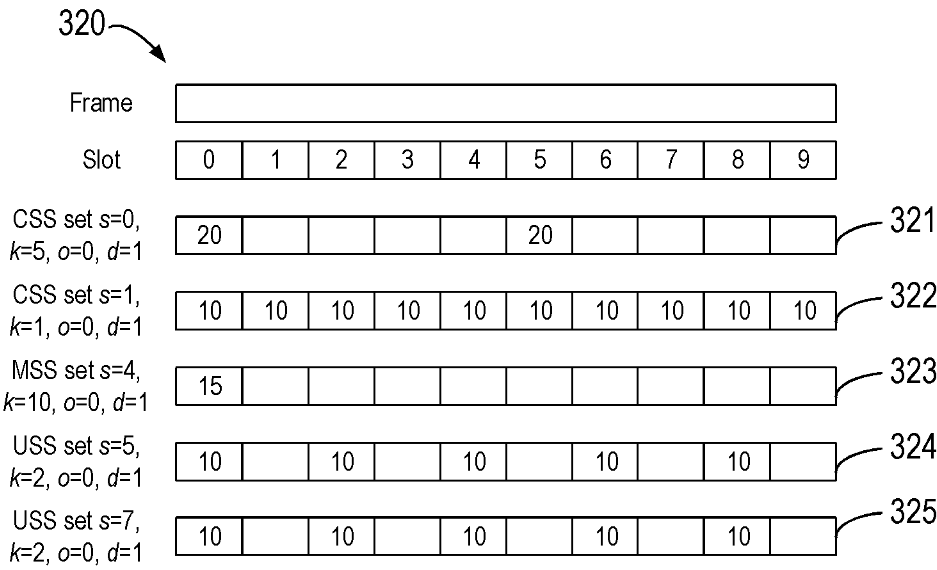
Figure 3C:
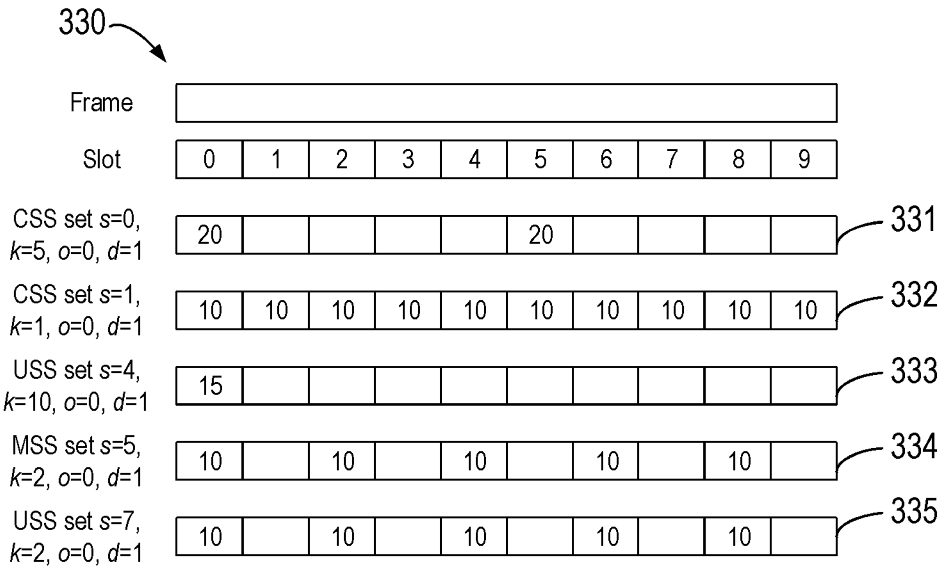

FIGS. 3A-3C illustrate different scenarios of handling priorities of search space sets according to some example embodiments of the present disclosure. In FIGS. 3A-3C, the character 's' represents an index of the SS set, the character 'k' represents the periodicity of the SS set, the character 'o' represents an offset of the SS set and the character represents the duration of the SS set. That is, the values of 'k' and 'o' identify the starting slot of the SS set, while the value of indicates the number of consecutive slots where the SS set is monitored starting from the starting slot identified by the values of 'k' and 'o'. With respect to a specific SS set, a value in a corresponding slot represents the number of CCEs within the slot required to be monitored for possible PDCCH candidates.

FIG. 3A illustrates a scenario 310, in which CSS sets 311 and 312, USS sets 313 and 314 as well as a MSS set 315 are configured. According to indexes of the SS sets 311~315, the order of their priorities can be determined as: CSS set 311>CSS set 312>USS set 313>USS set 314>MSS set 315. In case of PDCCH overbooking or in case that the number of CCEs or BDs configured by the network device exceeds the UE capability, the CCEs for MSS set 315 with an index s=7 may be ignored in Slot 0 since MSS set 315 has the lowest priority as compared to other SS sets.

FIG. 3B illustrates a scenario 320, in which CSS sets 321 and 322, MSS set 323, as well as USS sets 324 and 325 are configured. According to indexes of the SS sets 321~325, the order of their priorities can be determined as: CSS set 321>CSS set 322>MSS set 323>USS set 324>USS set 325. In case of PDCCH overbooking or in case that the number of CCEs or BDs configured by the network device exceeds the UE capability, the CCEs for USS set 325 with an index s=7 may be ignored in Slot 0 since USS set 325 has the lowest priority as compared to other SS sets.

FIG. 3C illustrates a scenario 330, in which CSS sets 331 and 332, MSS set 334, as well as USS sets 333 and 335 are configured. According to indexes of the SS sets 321~325, the order of their priorities can be determined as: CSS set 331>CSS set 332>USS set 333>MSS set 334>USS set 335. In case of PDCCH overbooking or in case that the number of CCEs or BDs configured by the network device exceeds the UE capability, the CCEs for USS set 335 with an index s=7 may be ignored in Slot 0 since USS set 335 has the lowest priority as compared to other SS sets.

It can be seen from the above that, if MSS is configured using RRC signaling to the terminal device, the multicast traffic can be transmitted/monitored in the MSS. In case of PDCCH overbooking or in case that the number of CCEs or BDs configured by the network device exceeds the UE capability, the terminal device can drop (that is, not monitor) a SS set by considering the priorities of USS and MSS sets based on their indexes.

Figure 4:
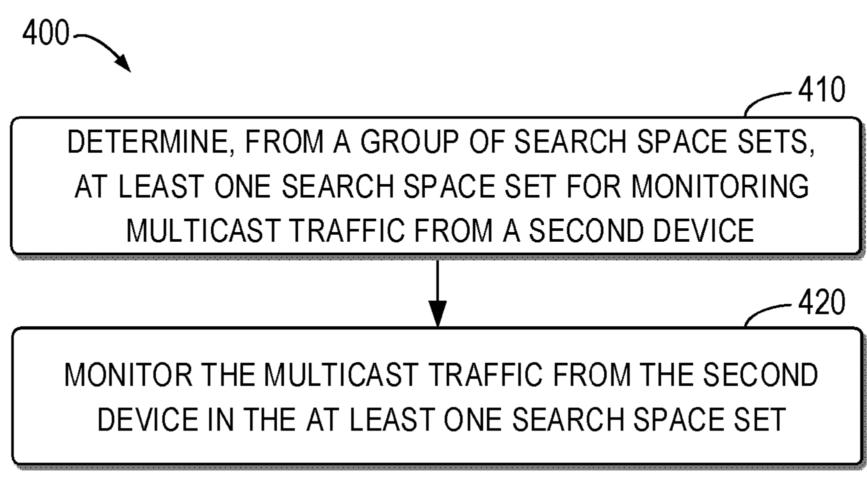
FIG. 4 illustrates a flowchart of an example method according to some example embodiments of the present disclosure.

FIG. 4 shows a flowchart of an example method 400 in accordance with some example embodiments of the present disclosure. The method 400 can be implemented at the terminal device 110 shown in FIG. 1 and/or FIG. 2. In the following, the terminal device 110 is also referred to as a "first device" and the network device 120 is also referred to as a "second device". It is to be understood that the method 400 may include additional blocks not shown and/or may omit some shown blocks, and the scope of the present disclosure is not limited in this regard.

At block 410, the first device determines, from a group of search space sets configured to the first device, at least one search space set for monitoring multicast traffic from a second device, based on at least one of a priority of the multicast traffic and respective types of the search space sets.

At block 420, the first device monitors the multicast traffic from the second device in the at least one search space set.

In some example embodiments, the group of search space sets may comprise at least one common search space set and at least one user-specific search space set. In accordance with a determination that the priority of the multicast traffic meets a predetermined criterion, the first device may determine the at least one search space set for monitoring the multicast traffic from the at least one common search space set. In accordance with a determination that the priority of the multicast traffic fails to meet the predetermined criterion, the first device may determine the at least one search space set for monitoring the multicast traffic from the at least one user-specific search space set.

In some example embodiments, in response to the priority of the multicast traffic exceeding a threshold, the first device may determine that the priority of the multicast traffic meets the predetermined criterion. In response to the priority of the multicast traffic not exceeding the threshold, the first device may determine that the priority of the multicast traffic fails to meet the predetermined criterion.

In some example embodiments, the first device may select, from the at least one user-specific search space set, a user-specific search space set configured with an offset for randomization of a hash function of the user-specific search space set as the at least one search space set for monitoring the multicast traffic.

In some example embodiments, the first device may receive, from the second device, a configuration indicative of the priority of the multicast traffic.

In some example embodiments, the at least one search space set may be configured with an offset for randomization of a hash function of the at least one search space set, the first device may determine an initial seed at least based on the offset. The first device may determine the initial seed, based on the offset and C-RNTI of the first device. The first device may determine, based on the initial seed, control channel elements to be monitored in the at least one search space set and monitor the determined control channel elements for the multicast traffic from the second device.

In some example embodiments, the at least one search space set may be configured with an initial seed for determination of control channel elements to be monitored in the at least one search space set. The first device may determine the control channel elements based on the initial seed and monitor the determined control channel elements for the multicast traffic from the second device.

In some example embodiments, in accordance with a determination that the group of search space sets comprises a multicast search space set, the first device may determine the multicast search space set as the at least one search space set for monitoring the multicast traffic.

In some example embodiments, a priority of the multicast search space set is determined based on an index of the multicast search space set in user-specific and/or multicast search space sets comprised in the group of search space sets.

In some example embodiments, the first device may determine, based on a predefined initial seed, control channel elements to be monitored in the at least one search space set and monitor the determined control channel elements for the multicast traffic from the second device.

In some example embodiments, the first device may be a terminal device and the second device may be a network device serving the terminal device.

Figure 5:
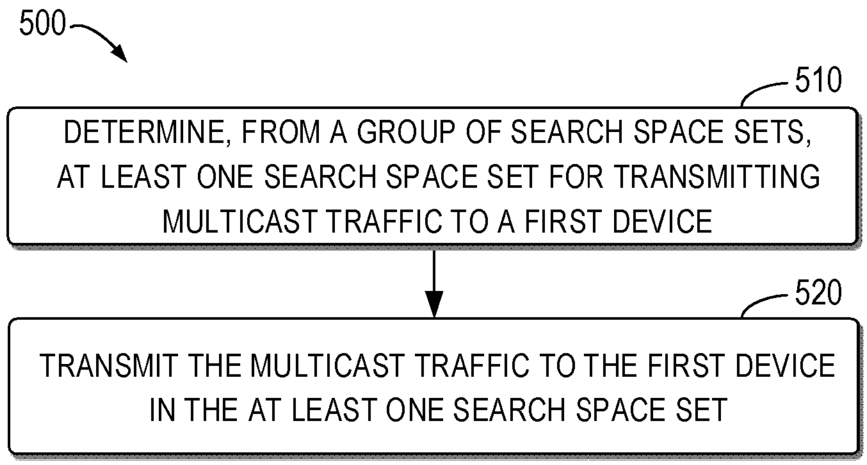
FIG. 5 illustrates a flowchart of an example method according to some example embodiments of the present disclosure.

FIG. 5 shows a flowchart of an example method 500 in accordance with some example embodiments of the present disclosure. The method 500 can be implemented at the network device 120 shown in FIG. 1 and/or FIG. 2. In the following, the terminal device 110 is also referred to as a "first device" and the network device 120 is also referred to as a "second device". It is to be understood that the method 500 may include additional blocks not shown and/or may omit some shown blocks, and the scope of the present disclosure is not limited in this regard.

At block 510, the second device determines, from a group of search space sets configured to the first device, at least one search space set for transmitting multicast traffic to a first device, based on at least one of a priority of the multicast traffic and respective types of the search space sets.

At block 520, the second device transmits the multicast traffic to the first device in the at least one search space set.

In some example embodiments, the group of search space sets may comprise at least one common search space set and at least one user-specific search space set. In accordance with a determination that the priority of the multicast traffic meets a predetermined criterion, the second device may determine the at least one search space set for monitoring the multicast traffic from the at least one common search space set. In accordance with a determination that the priority of the multicast traffic fails to meet the predetermined criterion, the second device may determine the at least one search space set for transmitting the multicast traffic from the at least one user-specific search space set.

In some example embodiments, in response to the priority of the multicast traffic exceeding a threshold, the second device may determine that the priority of the multicast traffic meets the predetermined criterion. In response to the priority of the multicast traffic not exceeding the threshold, the second device may determine that the priority of the multicast traffic fails to meet the predetermined criterion.

In some example embodiments, the second device may select, from the at least one user-specific search space set, a user-specific search space set configured with an offset for randomization of a hash function of the user-specific search space set as the at least one search space set for monitoring the multicast traffic.

In some example embodiments, the second device may transmit, to the first device, a configuration indicative of the priority of the multicast traffic.

In some example embodiments, the second device may transmit, to the first device, a configuration indicative of an offset for randomization of a hash function of the at least one search space set.

In some example embodiments, the second device may transmit, to the first device, a configuration indicative of an initial seed for determination of control channel elements to be monitored in the at least one search space set.

In some example embodiments, in accordance with a determination that the group of search space sets comprises a multicast search space set, the second device may determine the multicast search space set as the at least one search space set for transmitting the multicast traffic.

In some example embodiments, a priority of the multicast search space set is determined based on an index of the multicast search space set in user-specific and/or multicast search space sets comprised in the group of search space sets.

In some example embodiments, the first device may be a terminal device and the second device may be a network device serving the terminal device.

In some example embodiments, an apparatus capable of performing the method 400 may comprise means for performing the respective steps of the method 400. The means may be implemented in any suitable form. For example, the means may be implemented in a circuitry or software module.

In some example embodiments, the apparatus capable of performing the method 400 (for example, the terminal device 110) comprises: means for determining, from a group of search space sets configured to the apparatus, at least one search space set for monitoring multicast traffic from a further apparatus, based on at least one of a priority of the multicast traffic and respective types of the search space sets; and means for monitoring the multicast traffic from the further apparatus in the at least one search space set.

In some example embodiments, the group of search space sets comprises at least one common search space set and at least one user-specific search space set, and the means for determining the at least one search space set for monitoring the multicast traffic comprises: means for in accordance with a determination that the priority of the multicast traffic meets a predetermined criterion, determining the at least one search space set for monitoring the multicast traffic from the at least one common search space set; and means for in accordance with a determination that the priority of the multicast traffic fails to meet the predetermined criterion, determining the at least one search space set for monitoring the multicast traffic from the at least one user-specific search space set.

In some example embodiments, the apparatus capable of performing the method 400 further comprises means for in response to the priority of the multicast traffic exceeding a threshold, determining that the priority of the multicast traffic meets the predetermined criterion; and means for in response to the priority of the multicast traffic not exceeding the threshold, determining that the priority of the multicast traffic fails to meet the predetermined criterion.

In some example embodiments, the means for determining the at least one search space set for monitoring the multicast traffic from the at least one user-specific search space set comprises: means for selecting, from the at least one user-specific search space set, a user-specific search space set configured with an offset for randomization of a hash function of the user-specific search space set as the at least one search space set for monitoring the multicast traffic.

In some example embodiments, the apparatus capable of performing the method 400 further comprises means for receiving, from the further apparatus, a configuration indicative of the priority of the multicast traffic.

In some example embodiments, the at least one search space set is configured with an offset for randomization of a hash function of the at least one search space set, and the means for monitoring the multicast traffic from the second device in the at least one search space set comprises: means for determining an initial seed at least based on the offset; means for determining, based on the initial seed, control channel elements to be monitored in the at least one search space set; and means for monitoring the determined control channel elements for the multicast traffic from the further apparatus.

In some example embodiments, the means for determining the initial seed comprises: means for determining the initial seed based on the offset and Cell-Radio Network Temporary Identifier of the apparatus.

In some example embodiments, the at least one search space set is configured with an initial seed for determination of control channel elements to be monitored in the at least one search space set, and the means for monitoring the multicast traffic from the further apparatus in the at least one search space set comprises: means for determining the control channel elements based on the initial seed; and means for monitoring the determined control channel elements for the multicast traffic from the further apparatus.

In some example embodiments, the means for determining the at least one search space set for monitoring the multicast traffic comprises: means for in accordance with a determination that the group of search space sets comprises a multicast search space set, determining the multicast search space set as the at least one search space set for monitoring the multicast traffic.

In some example embodiments, a priority of the multicast search space set is determined based on an index of the multicast search space set in user-specific and/or multicast search space sets comprised in the group of search space sets.

In some example embodiments, the means for monitoring the multicast traffic from the further apparatus in the at least one search space set comprises: means for determining, based on a predefined initial seed, control channel elements to be monitored in the at least one search space set; and means for monitoring the determined control channel elements for the multicast traffic from the further apparatus.

In some example embodiments, the apparatus is a terminal device and the further apparatus is a network device serving the terminal device.

In some example embodiments, an apparatus capable of performing the method 500 may comprise means for performing the respective steps of the method 500. The means may be implemented in any suitable form. For example, the means may be implemented in a circuitry or software module.

In some example embodiments, the apparatus capable of performing the method 500 (for example, the network device 120) comprises: means for determining, from a group of search space sets configured to a further apparatus, at least one search space set for transmitting multicast traffic to the further apparatus, based on at least one of a priority of the multicast traffic and respective types of the search space sets; and means for transmitting the multicast traffic to the further apparatus in the at least one search space set.

In some example embodiments, the group of search space sets comprises at least one common search space set and at least one user-specific search space set, and the means for determining the at least one search space set for transmitting the multicast traffic comprises: means for in accordance with a determination that the priority of the multicast traffic meets a predetermined criterion, determining the at least one search space set for monitoring the multicast traffic from the at least one common search space set; and means for in accordance with a determination that the priority of the multicast traffic fails to meet the predetermined criterion, determining the at least one search space set for transmitting the multicast traffic from the at least one user-specific search space set.

In some example embodiments, the apparatus capable of performing the method 500 further comprises: means for in response to the priority of the multicast traffic exceeding a threshold, determining that the priority of the multicast traffic meets the predetermined criterion; and means for in response to the priority of the multicast traffic not exceeding the threshold, determining that the priority of the multicast traffic fails to meet the predetermined criterion.

In some example embodiments, the means for determining the at least one search space set for transmitting the multicast traffic from the at least one user-specific search space set comprises: means for selecting, from the at least one user-specific search space set, a user-specific search space set configured with an offset for randomization of a hash function of the user-specific search space set as the at least one search space set for monitoring the multicast traffic.

In some example embodiments, the apparatus capable of performing the method 500 further comprises: means for transmitting, to the further apparatus, a configuration indicative of the priority of the multicast traffic.

In some example embodiments, the apparatus capable of performing the method 500 further comprises: means for transmitting, to the further apparatus, a configuration indicative of an offset for randomization of a hash function of the at least one search space set.

In some example embodiments, the apparatus capable of performing the method 500 further comprises: means for transmitting, to the further apparatus, a configuration indicative of an initial seed for determination of control channel elements to be monitored in the at least one search space set.

In some example embodiments, the means for determining the at least one search space set for transmitting the multicast traffic comprises: means for in accordance with a determination that the group of search space sets comprises a multicast search space set, determining the multicast search space set as the at least one search space set for transmitting the multicast traffic.

In some example embodiments, a priority of the multicast search space set is determined based on an index of the multicast search space set in user-specific and/or multicast search space sets comprised in the group of search space sets.

In some example embodiments, the further apparatus is a terminal device and the apparatus is a network device serving the terminal device.

Figure 6:
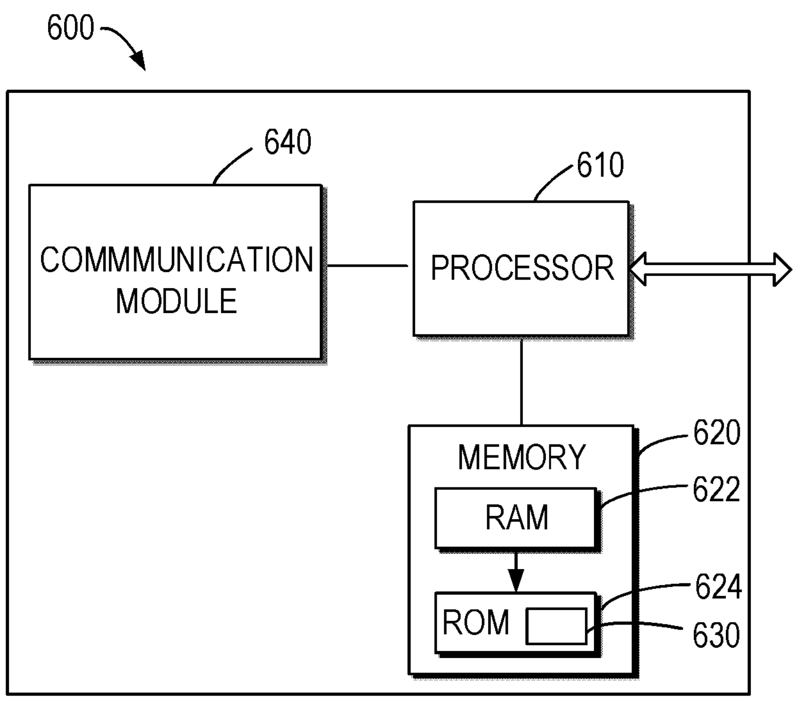
FIG. 6 illustrates a simplified block diagram of an apparatus that is suitable for implementing embodiments of the present disclosure.

FIG. 6 is a simplified block diagram of a device 600 that is suitable for implementing embodiments of the present disclosure. For example, the network device 120 and/or the terminal device 110 can be implemented by the device 600. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 2-5. The embodiments of the present disclosure may also be implemented by hardware or by a combination of software and hardware.

Figure 7:
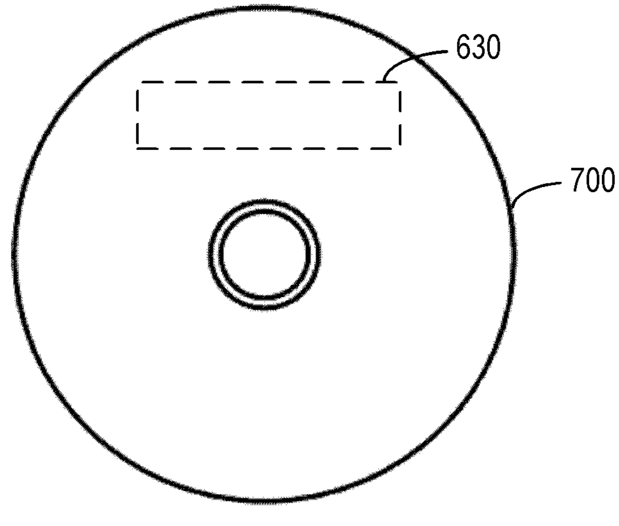
FIG. 7 illustrates a block diagram of an example computer readable medium in accordance with some example embodiments of the present disclosure.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 600 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 600 may be instead comprised in the distributed unit, and at least some of the described processes may be performed by the distributed unit.

In an embodiment, the execution of at least some of the functionalities of the device 600 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 600 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 as described above with reference to FIG. 4 and/or the method 500 as described above with reference to FIG. 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:

at least one processor; and at least one memory including computer program codes;

the at least one memory and the computer program codes are configured to, with the at least one processor, cause the first device to:

determine, from a group of search space sets configured to the first device, at least one search space set for monitoring multicast traffic from a second device wherein the group of search space sets comprises at least one common search space set and at least one user-specific search space set, based on at least one of a priority of the multicast traffic and respective types of the at least one search space sets, cause the first device to:

determine, in accordance with a determination that the priority of the multicast traffic meets a predetermined criterion, the at least one search space set for monitoring the multicast traffic from the at least one common search space set; and determine, in accordance with a determination that the priority of the multicast traffic fails to meet the predetermined criterion, the at least one search space set for monitoring the multicast traffic from the at least one user-specific search space set from the group of search space sets; and monitor the multicast traffic from the second device in the at least one search space set.

2. The first device of claim 1, wherein the computer program codes are configured to, with the at least one processor, further cause the first device to:

in response to the priority of the multicast traffic exceeding a threshold, determine that the priority of the multicast traffic meets the predetermined criterion; and in response to the priority of the multicast traffic not exceeding the threshold, determine that the priority of the multicast traffic fails to meet the predetermined criterion.

3. The first device of claim 1, wherein the at least one memory and the computer program codes are configured to, with the at least one processor, cause the first device to:

select, from the at least one user-specific search space set, a user-specific search space set configured with an offset for randomization of a hash function of the user-specific search space set as the at least one search space set for monitoring the multicast traffic.

4. The first device of claim 1, wherein the computer program codes are configured to, with the at least one processor, further cause the first device to:

receive, from the second device, a configuration indicative of the priority of the multicast traffic.

5. The first device of claim 1, wherein the at least one search space set is configured with an offset for randomization of a hash function of the at least one search space set, and the computer program codes are configured to, with the at least one processor, cause the first device to:

determine an initial seed at least based on the offset;

determine, based on the initial seed, control channel elements to be monitored in the at least one search space set; and monitor the determined control channel elements for the multicast traffic from the second device.

6. The first device of claim 5, wherein the computer program codes are configured to, with the at least one processor, cause the first device to:

determine the initial seed based on the offset and Cell-Radio Network Temporary Identifier of the first device.

7. The first device of claim 1, wherein the at least one search space set is configured with an initial seed for determination of control channel elements to be monitored in the at least one search space set, and the computer program codes are configured to, with the at least one processor, cause the first device to:

determine the control channel elements based on the initial seed; and monitor the determined control channel elements for the multicast traffic from the second device.

8. The first device of claim 1, wherein the computer program codes are configured to, with the at least one processor, cause the first device to:

in accordance with a determination that the group of search space sets comprises a multicast search space set, determine the multicast search space set as the at least one search space set for monitoring the multicast traffic.

9. The first device of claim 8, wherein a priority of the multicast search space set is determined based on an index of the multicast search space set in user-specific and/or multicast search space sets comprised in the group of search space sets.

10. The first device of claim 8, wherein the computer program codes are configured to, with the at least one processor, cause the first device to:

determine, based on a predefined initial seed, control channel elements to be monitored in the at least one search space set; and monitor the determined control channel elements for the multicast traffic from the second device.

11. The first device of claim 1, wherein the first device is a terminal device and the second device is a network device serving the terminal device.

12. A second device comprising:

at least one processor; and at least one memory including computer program codes;

the at least one memory and the computer program codes are configured to, with the at least one processor, cause the second device to:

determine, from a group of search space sets configured to a first device, at least one search space set for transmitting multicast traffic to the first device wherein the group of search space sets comprises at least one common search space set and at least one user-specific search space set, based on at least one of a priority of the multicast traffic and respective types of the search space sets, cause the second device to:

determine, in accordance with a determination that the priority of the multicast traffic meets a predetermined criterion, the at least one search space set for monitoring the multicast traffic from the at least one common search space set; and determine, in accordance with a determination that the priority of the multicast traffic fails to meet the predetermined criterion, the at least one search space set for transmitting the multicast traffic from the at least one user-specific search space set from the group of search space sets; and transmit the multicast traffic to the first device in the at least one search space set.

13. The second device of claim 12, wherein the computer program codes are configured to, with the at least one processor, further cause the second device to:

in response to the priority of the multicast traffic exceeding a threshold, determine that the priority of the multicast traffic meets the predetermined criterion; and in response to the priority of the multicast traffic not exceeding the threshold, determine that the priority of the multicast traffic fails to meet the predetermined criterion.

14. The second device of claim 12, wherein the computer program codes are configured to, with the at least one processor, cause the second device to:

select, from the at least one user-specific search space set, a user-specific search space set configured with an offset for randomization of a hash function of the user-specific search space set as the at least one search space set for monitoring the multicast traffic.

15. The second device of claim 12, wherein the computer program codes are configured to, with the at least one processor, further cause the second device to:

transmit, to the first device, a configuration indicative of the priority of the multicast traffic.

16. The second device of claim 12, wherein the computer program codes are configured to, with the at least one processor, further cause the second device to:

transmit, to the first device, a configuration indicative of an offset for randomization of a hash function of the at least one search space set.

17. The second device of claim 12, wherein the computer program codes are configured to, with the at least one processor, further cause the second device to:

transmit, to the first device, a configuration indicative of an initial seed for determination of control channel elements to be monitored in the at least one search space set.

18. The second device of claim 12, wherein the computer program codes are configured to, with the at least one processor, cause the second device to:

in accordance with a determination that the group of search space sets comprises a multicast search space set, determine the multicast search space set as the at least one search space set for transmitting the multicast traffic.

19. The second device of claim 18, wherein a priority of the multicast search space set is determined based on an index of the multicast search space set in user-. specific and/or multicast search-space sets comprised in the group of search space sets.

20. The second device of claim 12, wherein the first device is a terminal device and the second device is a network device serving the terminal device.

* * * * *